US007623753B2

(12) United States Patent
Farnan et al.

(10) Patent No.: US 7,623,753 B2
(45) Date of Patent: Nov. 24, 2009

(54) METHOD FOR VIEWING AND CONTROLLING MULTIPLE DVR'S

(75) Inventors: F. Michael Farnan, Lititz, PA (US); Daniel J. Reese, Landisville, PA (US)

(73) Assignee: Robert Bosch GmbH, Stuttgart (DE)

( * ) Notice: Subject to any disclaimer, the term of this patent is extended or adjusted under 35 U.S.C. 154(b) by 968 days.

(21) Appl. No.: 10/280,651

(22) Filed: Oct. 25, 2002

(65) Prior Publication Data

US 2003/0081131 A1    May 1, 2003

Related U.S. Application Data

(60) Provisional application No. 60/348,300, filed on Oct. 26, 2001.

(51) Int. Cl.
*H04N 5/91* (2006.01)
*H04N 7/00* (2006.01)
*H04N 5/76* (2006.01)
*H04N 5/225* (2006.01)
*H04N 9/79* (2006.01)

(52) U.S. Cl. .............................. 386/46; 386/38; 386/97
(58) Field of Classification Search .................. 386/46, 386/38, 97
See application file for complete search history.

(56) References Cited

U.S. PATENT DOCUMENTS

| 5,517,236 | A  | * | 5/1996  | Sergeant et al. ............. 348/143 |
| 5,724,475 | A  |   | 3/1998  | Kirsten ....................... 386/109 |
| 5,982,418 | A  |   | 11/1999 | Ely ............................. 348/153 |
| 6,041,361 | A  |   | 3/2000  | Wilson et al. ............... 709/253 |
| 6,166,763 | A  | * | 12/2000 | Rhodes et al. .............. 348/143 |
| 6,452,612 | B1 | * | 9/2002  | Holtz et al. .................. 715/723 |
| 6,563,533 | B1 | * | 5/2003  | Colby ........................... 348/211.4 |
| 2002/0031120 | A1 | * | 3/2002  | Rakib, Selim Shlomo .. 370/386 |
| 2002/0122601 | A1 |   | 9/2002  | Peng ........................... 382/250 |
| 2002/0140819 | A1 | * | 10/2002 | Waehner et al. ........... 348/207.1 |
| 2002/0141732 | A1 | * | 10/2002 | Reese et al. .................. 386/46 |

FOREIGN PATENT DOCUMENTS

| EP | 1150510 | 10/2001 |
| WO | WO0128251 | 4/2001 |

OTHER PUBLICATIONS

Chen et al: "Complexity-scalable MPEG-4 FGS streaming for UMA" 2002 digest of Technical Papers. International Conference On Consumer Electronics (IEEE Cat. No. 02CH37300), Jun. 18-20, 2002, pp. 270-271.

* cited by examiner

*Primary Examiner*—Thai Tran
*Assistant Examiner*—Daquan Zhao
(74) *Attorney, Agent, or Firm*—Kenyon & Kenyon LLP

(57) ABSTRACT

A system and method for viewing and controlling a plurality of digital video recorders (DVRs). The system includes a video matrix switch comprising a plurality of inputs and outputs arranged as a matrix; a plurality of cameras and a plurality of DVRs having ports in communication with the plurality of inputs of the video matrix switch; a plurality of monitors attached to the plurality of outputs of the video matrix switch; a controller that is adapted for communication with at least one port of each of the DVRs, the controller also communicates with the video matrix switch and provides a mapping function between the DVRs and video matrix switch inputs and outputs. The controller may comprise a computer that communicates with the plurality of DVRs via an Ethernet Switch, and the computer communicates the route DVR commands to the appropriate DVR of the plurality of DVRs. By use of a table, the computer can reroute video images to backup DVRs in the event of a failure.

10 Claims, 5 Drawing Sheets

Configuration expanded for Backup DVRs

Figure 2 -- Camera Connections

Figure 3 -- Configuration expanded for Backup DVRs

FIGURE 4

Table 1 – Matrix to DVR Map, Primary DVRs

| DVR IP Address | DVR Output Connected to Matrix Input Number: | DVR Input | Matrix Input |
|---|---|---|---|
| 161.88.15.21 | 70 | 1 | 51 |
| | | 2 | 52 |
| | | 3 | 53 |
| | | 4 | 54 |
| 161.88.15.23 | 71 | 1 | 55 |
| | | 2 | 56 |
| | | 3 | 57 |
| | | 4 | 58 |
| 161.88.15.30 | 72 | 1 | 59 |
| | | 2 | 60 |
| | | 3 | 61 |
| | | 4 | 62 |

Fig. 5

Table 2 – Matrix to DVR Map, Backup DVRs

| DVR IP Address | DVR Output Connected to Matrix Input Number: | DVR Input | Matrix Output |
|---|---|---|---|
| 161.88.15.58 | 73 | 1 | 35 |
| | | 2 | 36 |
| | | 3 | 37 |
| | | 4 | 38 |
| 161.88.15.59 | 74 | 1 | 39 |
| | | 2 | 40 |
| | | 3 | 41 |
| | | 4 | 42 |

METHOD FOR VIEWING AND CONTROLLING MULTIPLE DVR'S

This application claims priority from provisional application No. 60/348,300 filed on Oct. 26, 2001.

BACKGROUND OF THE INVENTION

1. Field of the Invention

The present invention relates to video matrix systems and digital video recorders (DVRs). More particularly, the present invention relates to an integrated video matrix switch and a plurality of DVRs.

2. Description of the Related Art

Heretofore, video systems, for example, having a plurality of camera inputs and Digital Video Recorders were not integrated with each other in a matrix system.

SUMMARY OF THE INVENTION

According to an aspect of the current invention, a system and method for viewing and controlling multiple DVRs allows for control of both the Matrix and DVR systems using security system keyboards (such as, for example, the Philips Intuikey keyboards) and standard analog monitors. There can be a looping of cameras through the DVRs into the Matrix Switch, or vice-versa. In addition, at least one output of the DVRs are fed to the matrix switch. From the Matrix system keyboards, the present invention allows the call-up of direct Matrix connected cameras or call-up of the recorded camera video from the DVRs.

BRIEF DESCRIPTION OF THE DRAWINGS

FIG. 4 illustrates a matrix to DVR map using primary DVRs.

FIG. 5 illustrates a matrix to DVR map for backup DVRs.

DETAILED DESCRIPTION OF THE INVENTION

It is to be understood by persons of ordinary skill in the art that the following descriptions, which are in accordance with the drawings, are provided for purposes of illustration and not for limitation. An artisan understands that there are several ways that the instantly claimed invention may be practiced, each of which lies within the spirit of the invention and the scope of the appended claims.

Figure 1:
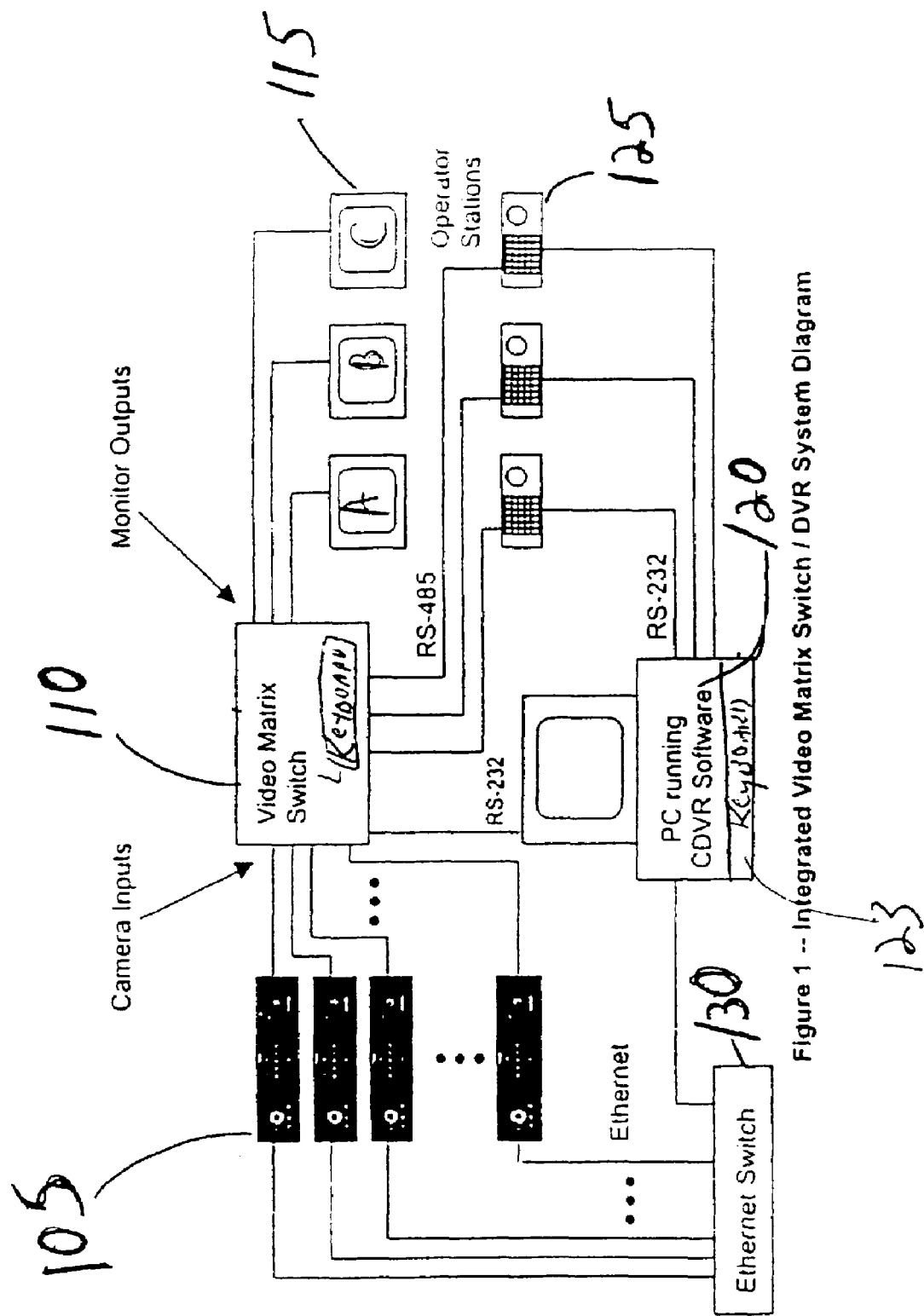
FIG. 1 illustrates an integrated Video Matrix Switch/DVR System Diagram according to an aspect of the present invention.
Figure 2:
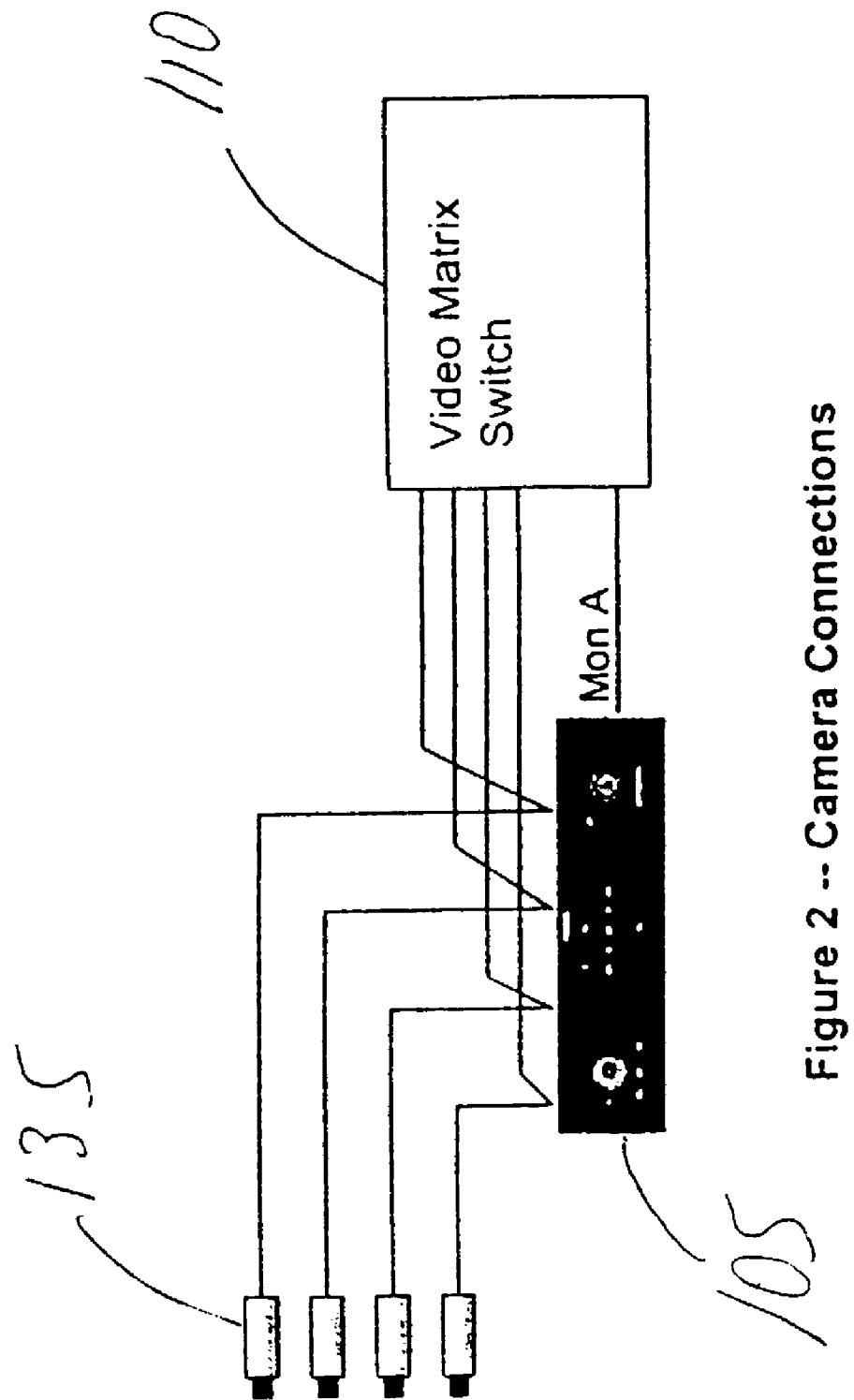
FIG. 2 illustrates a detail of the camera connections of one of the DVR's shown in FIG. 1.

FIG. 1 illustrates an integrated video matrix switch/DVR system diagram. There are a plurality of digital video recorders (DVRs) 105 that are each respectively connected to a video matrix switch 110. The DVRs are inputs to the video matrix switch. There are three monitor outputs 115 that are shown in this particular aspect of the invention, but it should be understood by persons of ordinary skill that the number can be significantly higher or lower than three. As shown in FIG. 2, the cameras in the system 135 are looped through four DVRs 105 to the matrix switch.

A computer 120 (typically a pc, but not necessarily) that runs camera mapping and control software, called CDVR software, is connected by a typical RS-232 port connection to the matrix switch. In addition, a number of operator stations 125 are also connected to the computer via typical RS-232 type connections. Finally, the computer 120 is also connected to the Ethernet switch 130, that is in turn connected to the DVRs.

In this particular aspect of the invention, there are three monitor outputs connected to the video matrix switch, but the amounts of monitors used can vary according to need.

As shown in FIG. 2, the cameras 135 are looped through the DVRs and into the switch 110. In addition, monitor outputs of the DVRs are fed to the switch 110. From the matrix system keyboards, this arrangement can permit the call-up of direct Matrix connected cameras or call-up of the recorded camera video from the DVRs.

The PC 120 is used to communicate with the DVRs via the Ethernet ports of Ethernet switch 130. The PC 120 also communicates with keyboards 123 such as "Intuikey" keyboards. When the keyboard selects a DVR mode, the Intuikey may mimic the front panel of the selected DVR. The DVR output will be switched to the user's matrix system monitor. This feature allows the user to use the DVR's embedded user interface to interact with the DVR.

The CDVR Software provides the following functions:

Provides the mapping between DVR and Video Matrix Switch inputs and outputs.

Communicates with the keyboards and routes DVR commands to the appropriate DVR.

Communicates with the DVRs and responds to failure messages (or loss of communication from the DVRs).

In response to the user putting the keyboard into DVR mode (by pressing one button on the Intuikey keyboard), automatically routes the video from the appropriate DVR to the user's Matrix monitor.

In response to the user putting the keyboard into DVR mode (by pressing one button on the Intuikey keyboard), automatically puts the DVR into Playback mode, playing back video from 1 minute prior to time that the DVR mode command is entered.

Automatically re-maps commands to backup units and reroutes video (via commands to the Matrix) in response to DVR failures.

Figure 3:
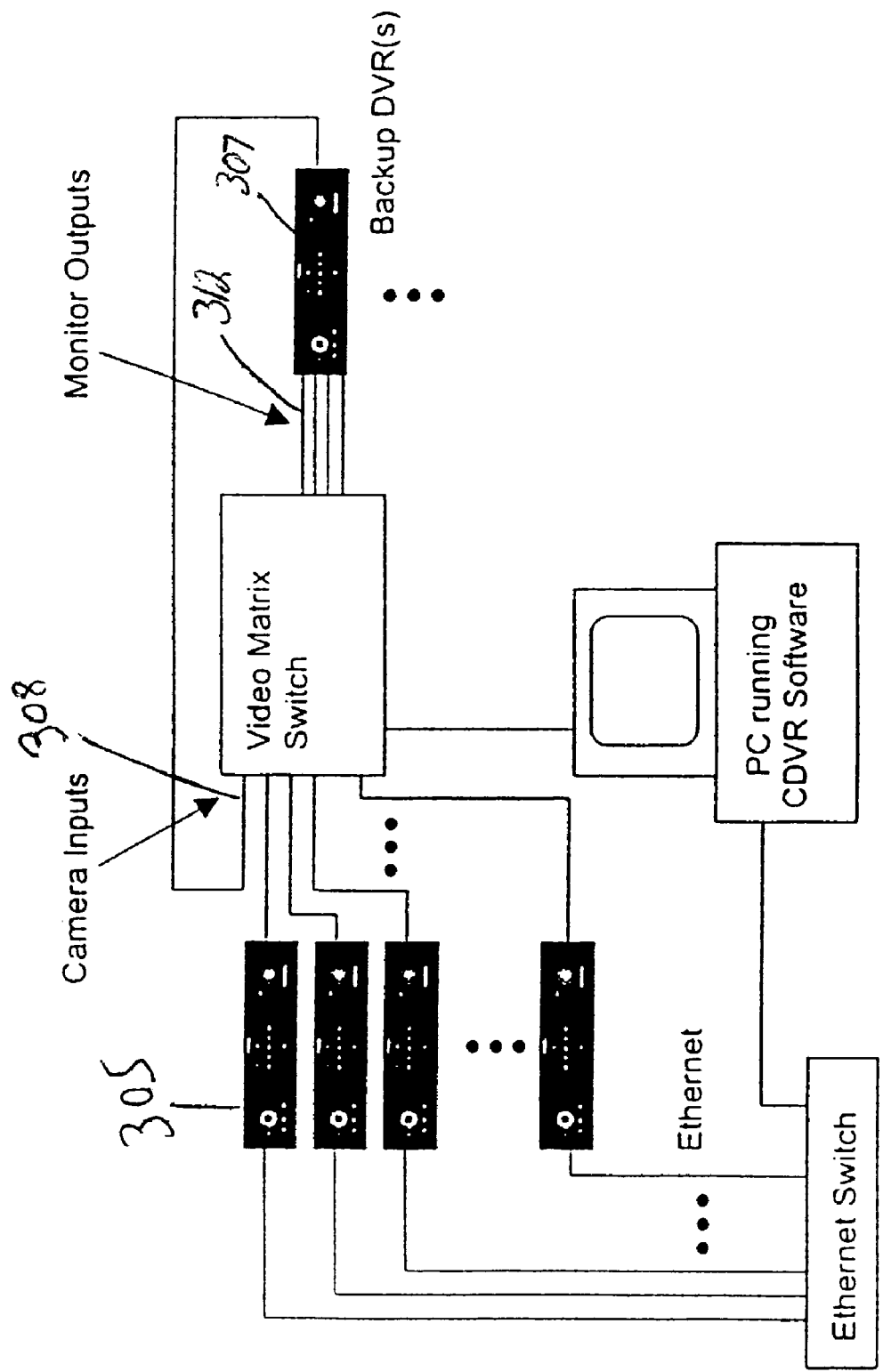
FIG. 3 illustrates another aspect of the present invention, showing a configuration expanded for backup DVRs.

In yet another aspect of the invention shown in FIG. 3, the previously described architecture can be extended to support hot switchover to backup DVRs in the event of a DVR failure. The DVRs 307 are allocated to specifically serve as backup units for the DVRs 305. For each backup unit 307, monitor outputs from the Matrix 310 feed the camera inputs 308 on the DVR. There typically would be one Matrix output for each DVR input.

When a DVR failure is detected, the PC will automatically instruct the Matrix to connect the cameras 135 associated with the failed DVR's inputs to the monitor outputs 312 connected to a backup unit 307. The PC 120 then re-maps all commands that would have gone to the failed DVR unit 325 to be re-routed to the backup unit 307. There can be multiple backup units supported by the PC, and the PC can track which backups are available and those already in use.

FIG. 4 is 1 a table provided for explanatory purposes. It should be understood that the following-described example is not intended in any way to limit the broad application of the presently claimed invention. As previously shown in FIG. 2, the camera inputs connect to both the DVRs and to the matrix. Assume that the operator is viewing a live video on matrix monitor 2 from the camera fed directly to the Matrix input 57. Should the operator, upon seeing an event, wish to review the recorded video. The sequence of events occurs can occur as follows:

(1) The operator changes the keyboard mode from a Matrix mode to a DVR mode by pressing a keyboard DVR softkey.

(2) The keyboard sends a corresponding message, typically via the RS-232 to the PC (there could be a wireless keyboard, or a connection other than RS-232). The message indicates that the DVR mode has been entered, and includes the current Matrix monitor (monitor 2) and camera being controlled by the keyboard (matrix input 57 shown in the table of FIG. 4).

(3) The CDVR then uses the Matrix camera number to look up the DVR number, then looks up the Matrix input tied to its monitor output (in this case the Matrix input number is 71).

(4) The CDVR commands the indicated DVR to switch to Playback mode from one minute prior to the command on the DVR camera number found in Table 1 (DVR ip address "161.88.15.23" is switched to input 3 in this example).

(5) The CDVR commands the Matrix to switch the user's Matrix monitor (monitor 2) to the DVR (Matrix input 71).

The user is now viewing the same camera on his monitor as before, but it is now recorded video from the DVR. It is then possible to control the DVR with the keyboard's virtual DVR front panel, allowing the user to easily review the recorded video for this camera.

In addition, as the user is now in DVR mode, he/she can also select other cameras on this DVR or exercise any other command supported by the DVR. To get back to matrix mode, the user selects the appropriate softkey on the Intuikey keyboard 123.

The above example assumes that the camera numbers used by the operator and displayed on the keyboard match the physical camera input numbers on the Matrix system. Frequently, these numbers are re-mapped in the video matrix system—the operator uses "logical" camera numbers, and the Matrix system software automatically converts these to "physical" camera numbers to perform switching and control. In this case, the CDVR software would query with existing Matrix System software with the logical camera number supplied in the keyboard message. The Matrix system would respond with the corresponding physical camera number, and the system then continues to operate as described above.

FIG. 5 is a table illustrating backup unit operation. This table sets up the mapping to illustrate backup operation. In the event of a DVR failure, either the failing unit sends a failure message to the CDVR software, or it simply stops responding to the communication. The CDVR software maintains lists of available backup units, and which of these units are in use. Assuming that an unallocated backup unit is available, CDVR software will allocate one of the unallocated backup units to cover the failed unit.

For example, assume that in an extension of the above example, FIG. 5 is configured as shown, no backup units are currently allocated to failed DVRs, and DVR ip address "161.88.15.231" fails. The CDVR software detects this happening, and in response allocates DVR "161.88.15.58" as the backup for the failed units. From FIG. 4, the CDVR determines that Matrix inputs 55,56,57 and 58 should be connected to the backup unit. From table 2, the CDVR determines that the Matrix outputs 35-38 are connected to the backup unit inputs, so it commands the Matrix to make the following input to output connections: 55 to 35, 56 to 36, 57 to 37, and 58 to 38. The backup unit is now connected to the same cameras as the failed DVR. If a user tries to access the failed DVR, the CDVR software automatically redirects the commands to the allocated backup DVR.

In addition, when the user switches from the direct matrix connected inputs to DVR control, the system automatically performs the switching such that the user is viewing the same video, but from the output of the backup DVR instead of the direct Matrix connection. The CDVR software will command the Matrix to turn off its on screen display—the DVR's on screen display will be shown instead.

It is also within the spirit of the invention and the scope of the appended claims to automatically assign camera titles from the Matrix to the DVR titles. It would also be possible to dynamically make the assignments when a backup unit is assigned to cover a failed DVR.

It is also within the spirit of the invention and the scope of the appended claims to automatically synchronize the clocks of the Matrix, the DVRs, and the PC.

What is claimed is:

1. A system for viewing and controlling a plurality of digital video recorders (DVRs), comprising:

a video matrix switch comprising a plurality of inputs and outputs arranged as a matrix;

a plurality of cameras and a plurality of DVRs having ports in communication with the plurality of inputs of the video matrix switch;

a plurality of monitors attached to the plurality of outputs of the video matrix switch;

a controller that is adapted for communication with at least one port of each of the DVRs, wherein the controller also communicates with the video matrix switch and provides a mapping function between the DVRs and video matrix switch inputs and outputs; and a keyboard that is adapted to provide a matrix mode and a DVR mode, where the matrix mode is for matrix system control, and the DVR mode provides full control over a DVR connected to the system;

wherein:

the controller includes a computer that communicates with the plurality of DVRs via an Ethernet Switch, and the computer includes a plurality of modes including a matrix mode for viewing on a particular monitor the live image captured by a particular camera and a DVR mode for viewing recorded images and controlling a DVR, and a softkey for changing between the modes, the computer communicates DVR commands to an appropriate DVR of the plurality of DVRs, the computer responds to loss of communication/failure messages of the DVRs and automatically re-maps route DVR commands to allocated DVR backup units, the re-mapping function includes designating logical camera numbers for operator or automatic selection, and designating physical camera numbers which the logical camera numbers are converted to so as to facilitate switching and control between the matrix and DVR and playback modes, a keyboard communicates with the computer, the keyboard being adapted for initiating a display of a virtual DVR front panel on a particular monitor to facilitate review of recorded video from a camera, and pressing the softkey causes the computer to identify the DVR associated with a particular camera and monitor, and to call up the recorded video from an earlier time from the particular camera that was being displayed on the monitor, so that a camera displayed on the monitor is the same as the particular camera but now with recorded video instead of live video.

2. The system according to claim 1, wherein the DVR mode permits user selection of another camera from the plurality of cameras.

3. The system according to claim 1, wherein the plurality of cameras and plurality of DVRs are respectively associated with each other, so that a respective camera and a respective DVR are attached together and in communication with a respective input of the plurality of inputs of the video matrix switch.

4. The system according to claim 1, further comprising: a plurality of operator stations connected to the computer and to the video matrix switch.

5. The system according to claim 1, wherein the DVR mode permits user selection of another camera from the plurality of cameras, wherein the plurality of cameras and plurality of DVRs are respectively associated with each other, so that a respective camera and a respective DVR are attached together and in communication with a respective input of the plurality of inputs of the video matrix switch, and wherein the keyboard is adapted for initiating a virtual DVR front panel to facilitate review of recorded video from a camera.

6. A method of providing viewing and controlling of multiple digital video recorders (DVRs) comprising the steps of: (a) providing a video matrix switch comprising a plurality of inputs and outputs arranged as a matrix; (b) arranging a plurality of cameras and a plurality of DVRs having ports in communication with the plurality of inputs of the video matrix switch; (c) attaching a plurality of monitors to the plurality of outputs of the video matrix switch; (d) controlling the DVRs, and the video matrix switch with a controller that provides a mapping function between the DVRs and video matrix switch inputs and outputs;

wherein:
the controller includes a computer that communicates with the plurality of DVRs via an Ethernet Switch, and the computer includes a plurality of modes including a matrix mode for viewing on a particular monitor the live image captured by a particular camera and a DVR mode for viewing recorded images and controlling a DVR, and a softkey for changing between the modes, the computer communicates DVR commands to an appropriate DVR of the plurality of DVRs, the computer responds to loss of communication/failure messages of the DVRs and automatically re-maps route DVR commands to allocated DVR backup units, the re-mapping function includes designating logical camera numbers for operator or automatic selection, and designating physical camera numbers which the logical camera numbers are converted to so as to facilitate switching and control between the matrix and DVR and playback modes, a keyboard communicates with the computer, the keyboard being adapted for initiating a display of a virtual DVR front panel on a particular monitor to facilitate review of recorded video from a camera, and pressing the softkey causes the computer to identify the DVR associated with a particular camera and monitor, and to call up the recorded video from an earlier time from the particular camera that was being displayed on the monitor, so that a camera displayed on the monitor is the same as the particular camera but now with recorded video instead of live video.

7. The method according to claim 6, wherein the DVR mode permits user selection of another camera from the plurality of cameras, wherein the plurality of cameras and plurality of DVRs are respectively associated with each other, so that a respective camera and a respective DVR are attached together and in communication with a respective input of the plurality of inputs of the video matrix switch, and wherein the keyboard is adapted for initiating a virtual DVR front panel to facilitate review of recorded video from a camera.

8. The method according to claim 6, wherein the DVR mode permits user selection of another camera from the plurality of cameras.

9. The method according to claim 6, wherein the plurality of cameras and plurality of DVRs are respectively associated with each other, so that a respective camera and a respective DVR are attached together and in communication with a respective input of the plurality of inputs of the video matrix switch.

10. The method according to claim 6, wherein a plurality of operator stations is connected to the computer and to the video matrix switch.

* * * * *

UNITED STATES PATENT AND TRADEMARK OFFICE
CERTIFICATE OF CORRECTION

PATENT NO.      : 7,623,753 B2                                    Page 1 of 1
APPLICATION NO. : 10/280651
DATED           : November 24, 2009
INVENTOR(S)     : Farnan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1595 days.

Signed and Sealed this

Twenty-sixth Day of October, 2010

David J. Kappos
*Director of the United States Patent and Trademark Office*